US012354548B2

(12) United States Patent
Zhou et al.

(10) Patent No.: US 12,354,548 B2
(45) Date of Patent: Jul. 8, 2025

(54) VOLTAGE COMPENSATION CIRCUIT, VOLTAGE COMPENSATION METHOD AND DISPLAY DEVICE

(71) Applicant: HKC CORPORATION LIMITED, Shenzhen (CN)

(72) Inventors: Mancheng Zhou, Shenzhen (CN); Baohong Kang, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 25 days.

(21) Appl. No.: 18/471,343

(22) Filed: Sep. 21, 2023

(65) Prior Publication Data

US 2024/0312405 A1 Sep. 19, 2024

(30) Foreign Application Priority Data

Mar. 14, 2023 (CN) ......................... 202310304859.0

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2330/021* (2013.01)

(58) Field of Classification Search
CPC combination set(s) only.
See application file for complete search history.

(56) References Cited

U.S. PATENT DOCUMENTS 11,107,415 B2 * 8/2021 Meng .................. G09G 3/3233
11,250,747 B2 * 2/2022 Park ...................... G09G 3/006
2011/0084955 A1 4/2011 Kim
(Continued)

FOREIGN PATENT DOCUMENTS

CN 106782310 A 5/2017
CN 107749280 A 3/2018
(Continued)

OTHER PUBLICATIONS

Office Action issued on Apr. 15, 2024, in corresponding Chinese Application No. 202310304859.0, 8 pages.
(Continued)

*Primary Examiner* — Olga V Merkoulova
(74) *Attorney, Agent, or Firm* — Maier & Maier, PLLC

(57) ABSTRACT

A voltage compensation circuit, voltage compensation method, and display device, in which the voltage compensation circuit is applicable to the pixel unit of the 2T1C structure; during the voltage sensing period, the changed data signal is adjusted and output to the pixel unit, and the data signal is sensed at the turning-on moment of the second transistor of the pixel unit, and the threshold voltage is determined according to the voltage value of the data signal at the turning-on moment; and during the voltage compensation period, the voltage value of the compensated data signal is determined according to the threshold voltage value and output to the corresponding pixel unit; sensing of the threshold of the second transistor is realized, and there is no need to arrange T3, sensor line or control signal line, the structure of the display panel is simplified and the design cost is reduced.

20 Claims, 8 Drawing Sheets

(56) References Cited

U.S. PATENT DOCUMENTS

| | | | | |
|---|---|---|---|---|
| 2014/0022289 | A1* | 1/2014 | Lee | G09G 3/006<br>345/76 |
| 2017/0186373 | A1* | 6/2017 | Nishikawa | G09G 3/3266 |
| 2020/0160781 | A1* | 5/2020 | Park | G09G 3/3275 |
| 2020/0166658 | A1* | 5/2020 | Duan | G01T 1/247 |
| 2021/0074222 | A1* | 3/2021 | Meng | G09G 3/3275 |
| 2021/0097949 | A1* | 4/2021 | Qin | G09G 3/3611 |
| 2021/0104185 | A1* | 4/2021 | Park | G09G 3/3258 |

FOREIGN PATENT DOCUMENTS

| | | | |
|---|---|---|---|
| CN | 111599316 | A | 8/2020 |
| CN | 114203111 | A | 3/2022 |
| CN | 114822406 | A | 7/2022 |

OTHER PUBLICATIONS

Office Action issued on Feb. 6, 2024, in corresponding Chinese Application No. 202310304859.0, 16 pages.

* cited by examiner

VOLTAGE COMPENSATION CIRCUIT, VOLTAGE COMPENSATION METHOD AND DISPLAY DEVICE

CROSS-REFERENCE TO RELATED APPLICATIONS

This application claims the benefit of Chinese Patent Application No. 202310304859.0, entitled VOLTAGE COMPENSATION CIRCUIT, VOLTAGE COMPENSATION METHOD AND DISPLAY DEVICE, which was filed with China National Intellectual Property Administration on Mar. 14, 2023, and the entire contents of which are incorporated herein by reference.

TECHNICAL FIELD

The present disclosure relates to the field of display technology, in particular to a voltage compensation circuit, a voltage compensation method and a display device.

BACKGROUND

As a new generation of display panels, Organic Light-Emitting Diode (OLED) panels are one of the hot spots in the research field of flat panel display today. Compared with traditional Liquid Crystal Display (LCD), OLED panels have the advantages of low energy consumption, low production cost, self-lighting, wide viewing angle and fast response speed, etc.

In a large size OLED panel, the smallest pixel unit has the 3T1C architecture as shown in FIG. 1, where T1 is the data control transistor, responsible for the charge and discharge of the capacitor C, T2 is the drive control transistor, responsible for controlling the current reaching the LED, thus controlling the brightness of the LED, T3 is the sense transistor, used in an outgoing goods inspection where corresponding data signals and row-on signals are output and T3 senses the current flowing through T2 or the anode potential of the OLED device before a product, so as to determine the threshold voltage (Vth) of T2, and then determine the voltage value of the compensated data signal. The positive supply voltage terminals of all the pixel unit are commonly connected.

In this case, for example, as shown in FIG. 2, G1, G3, G5, etc. represent scan lines, G2, G4, G6, etc. represent control signal lines connected to T3, D1~D9 represent data lines, and S1~S9 represent sensor lines, due to the addition of the T3, the sensor lines and the control signal lines, the occupied area and trace space of a single pixel unit are increased for the display panel, resulting in a larger size of the display panel.

SUMMARY

The purpose of this disclosure is to provide a voltage compensation circuit, which is intended to solve the problem of large size of traditional display panels adopting 3T1C architecture to realize voltage sensing and compensation.

A first aspect of the embodiments of this disclosure provides a voltage compensation circuit applicable to a display panel, the display panel includes multiple rows of scan lines, multiple columns of data lines and multiple pixel units correspondingly connected with the scan lines and the data lines, the pixel unit includes at least a first transistor, a second transistor, a capacitor C and a light-emitting diode; positive supply voltage terminals of the respective pixel units are commonly connected, a first terminal of the first transistor is connected to the data line, a control terminal of the first transistor is connected to the scan line; a second terminal of the first transistor, a first terminal of the capacitor and a control terminal of the second transistor are commonly connected; a second terminal of the capacitor and a first terminal of the second transistor are commonly connected to form the positive supply voltage terminal of the pixel unit; a second terminal of the second transistor is connected to an anode of the light-emitting diode, and a cathode of the light-emitting diode OLED is connected to a negative supply voltage terminal;

the voltage compensation circuit includes:

a power supply circuit;

a driver circuit connected with the power supply circuit, the respective data lines, the respective scan lines and the positive supply voltage terminals of the pixel units, the driver circuit is used for:

during a voltage sensing period, controlling the pixel units to be powered on, and selectively controlling the first transistors of the respective pixel units to turn on in sequence, and outputting changed data signals to control the second transistors of the respective pixel units to switch from an OFF state to an ON state;

sensing voltage values of the data signals at the moment when the respective pixel units switch the state, and determining threshold voltages of the second transistors of the respective pixel units based on the data signals; and during a voltage compensation period, controlling the pixel units to be powered on and controlling respective rows of pixel units to turn on row by row, and outputting voltage-compensated data signals to the respective pixel units based on the threshold voltages of the second transistors of the respective pixel units.

Optionally, the power supply circuit is connected to the positive supply voltage terminals of the pixel units through the driver circuit, or the power supply circuit is directly connected to the positive supply voltage terminals of the pixel units.

Optionally, the driver circuit includes:

a current sensing circuit connected between the power supply circuit and the positive supply voltage terminals of the pixel units, wherein the current sensing circuit is used for outputting, during the voltage sensing period, a current feedback signal representing that the second transistor of the pixel unit has switched the state when sensing a current of the positive supply voltage signal;

a control output circuit connected with the power supply circuit, the respective data lines, the respective scan lines and the current sensing circuit, wherein the output circuit is used for:

during the voltage sensing period, outputting a first control signal to the power supply circuit, so that the power supply circuit outputs the positive supply voltage signal, and the positive supply voltage signal is output to the positive supply voltage terminals of the pixel units through the current sensing circuit;

outputting a row HIGH signal to turn on the first transistor of a corresponding pixel unit, so as to select and control the respective pixel units in sequence for performing voltage sensing; and during the voltage sensing period of each pixel unit, outputting the changed data signal to control the second transistor of the pixel unit to switch from the OFF state to the ON state;

sensing, when receiving the current feedback signal, the voltage value of the data signal at the moment when the sensed state is switched; and determining the threshold voltage of the second transistor of the pixel unit during each voltage sensing period based on the data signal; and during the voltage compensation period, controlling the power supply circuit to output the positive supply voltage signal to the positive supply voltage terminals of the pixel units, and controlling the respective rows of pixel units to turn on row by row, and outputting the voltage-compensated data signals to the respective pixel units based on the threshold voltages of the second transistors of the respective pixel units.

Optionally, the driver circuit includes:

a current sensing circuit connected between the power supply circuit and the positive supply voltage terminals of the pixel units; wherein the current sensing circuit is used for outputting, during the voltage sensing period, a current feedback signal representing that the second transistor of the pixel unit has switched the state when sensing a current of the positive supply voltage signal;

a first switch circuit connected with the current sensing circuit in parallel;

a control output circuit connected with the power supply circuit, the respective data lines, the respective scan lines, the current sensing circuit and the first switch circuit, wherein the control output circuit is used for:

during the voltage sensing period, outputting a switching-off signal to control the first switch circuit to switch off, so that the positive supply voltage signal is output to the positive supply voltage terminals of the pixel units through the current sensing circuit;

outputting a row HIGH signal to turn on the first transistor of a corresponding pixel unit, so as to select and control the respective pixel units in sequence for performing the voltage sensing; and during the voltage sensing period of each pixel unit, outputting the changed data signal to control the second transistor of the pixel unit to switch from the OFF state to the ON state;

sensing, when receiving the current feedback signal, the voltage value of the data signal at the moment when the sensed state is switched; and determining the threshold voltages of the second transistor of the pixel unit during each voltage sensing period based on the data signal; and during the voltage compensation period, outputting a switching-on signal to control the first switch circuit to switch on, so that the positive supply voltage signal is output to the positive supply voltage terminals of the pixel units through the first switch circuit, and controlling the respective rows of pixel units to turn on row by row, and outputting the voltage-compensated data signals to the respective pixel units based on the threshold voltages of the second transistors of the respective pixel units.

Optionally, the driver circuit further includes a second switch circuit, the second switch circuit and the current sensing circuit are connected in series between the power supply circuit and the positive supply voltage terminals of the pixel units, the second switch circuit is further connected to the control output circuit;

the control output circuit is further used for:

during the voltage sensing period, outputting a switching-on signal to control the second switch circuit to switch on; and during the voltage compensation period, outputting a switching-off signal to control the second switch circuit to switch off.

A second aspect of the embodiments of this disclosure provides a voltage compensation method applicable to the above-mentioned voltage compensation circuit and a display panel, the voltage compensation method includes:

during the voltage sensing period, selecting and controlling the first transistors of the respective pixel units to turn on in sequence, and outputting the changed data signals to control the second transistors of the respective pixel units to switch from the OFF state to the ON state;

sensing the voltage value of the data signal at the moment when each pixel unit switches the state, and determining the threshold voltage of the second transistor of each pixel unit based on the data signal Data; and during the voltage compensation period, controlling the respective rows of pixel units to turn on row by row, and outputting the voltage-compensated data signals to the respective pixel units based on the threshold voltages of the second transistors of the respective pixel units.

Optionally, the step of selecting and controlling the first transistors of the respective pixel units to turn on in sequence includes:

during the voltage sensing period, outputting the row HIGH signals to the first transistors of the respective rows of pixel units row by row, and selecting each row of pixel units 10 to perform the voltage sensing in sequence during the output time period of each row HIGH signal to each row; or during the voltage sensing period, taking a column of pixel units as a pixel groups, and outputting the row HIGH signals row by row in each frame to the respective pixel units in a corresponding pixel group, so as to select and control the respective pixel units of the respective pixel groups to perform the voltage sensing.

Optionally, the step of outputting the changed data signals to control the second transistors of the respective pixel units to switch from the OFF state to the ON state includes:

during the voltage sending period of a corresponding pixel unit, outputting the changed data signal to the second transistor of a matching pixel unit to control the second transistor of the pixel unit to switch from the OFF state to the ON state; and outputting a preset LOW voltage to the second transistors of the respective unmatched pixel units in the same row, to control the unmatched pixel units in the same row to turn off.

Optionally, the voltage compensation method further includes:

during the voltage sensing period and the voltage compensation period, outputting the positive supply voltage signal to the positive supply voltage terminals of the pixel units.

A third aspect of the embodiments of this disclosure provides a display device including a display panel and the above-mentioned voltage compensation circuit, in which the voltage compensation circuit is correspondingly connected to the display panel, and the voltage compensation circuit is arranged on the display panel or separated from the display panel.

The beneficial effects of the embodiments of this disclosure over the prior art are: the above-mentioned voltage compensation circuit is applicable to the pixel unit of the 2T1C structure; during the voltage sensing period, the changed data signal is adjusted and output to the pixel unit, and the data signal is sensed at the turning-on moment of the second transistor of the pixel unit, and the threshold voltage is determined according to the voltage value of the data signal at the turning-on moment; and during the voltage compensation period, the voltage value of the compensated data signal is determined according to the threshold voltage value and output to the corresponding pixel unit; thereby sensing of the threshold of the second transistor is realized, and there is no need to arrange T3, the sensor line or the control signal line, the structure of the display panel is simplified and the design cost is reduced.

DETAILED DESCRIPTION OF THE EMBODIMENTS

To make the technical problems to be solved, technical solutions and beneficial effects in this disclosure more clear, the disclosure is further described in detail in combination with the accompanying drawings and embodiments. It should be understood that the specific embodiments described herein are intended only to explain this disclosure rather than limit the disclosure.

In addition, the terms "first", "second" are used only for description and are not to be construed as indicating or suggesting relative importance or implying the number of technical features indicated. Thus, a feature defined by "first" or "second" may explicitly or implicitly include one or more of the features. In the description of this disclosure, "multiple" means two or more unless otherwise expressly specified.

First Embodiment

Figure 1:
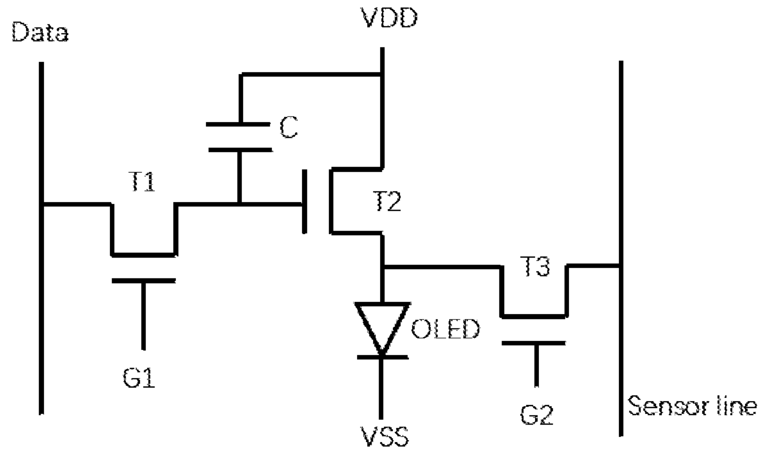
FIG. 1 is a schematic circuit diagram of a traditional pixel unit.
Figure 2:
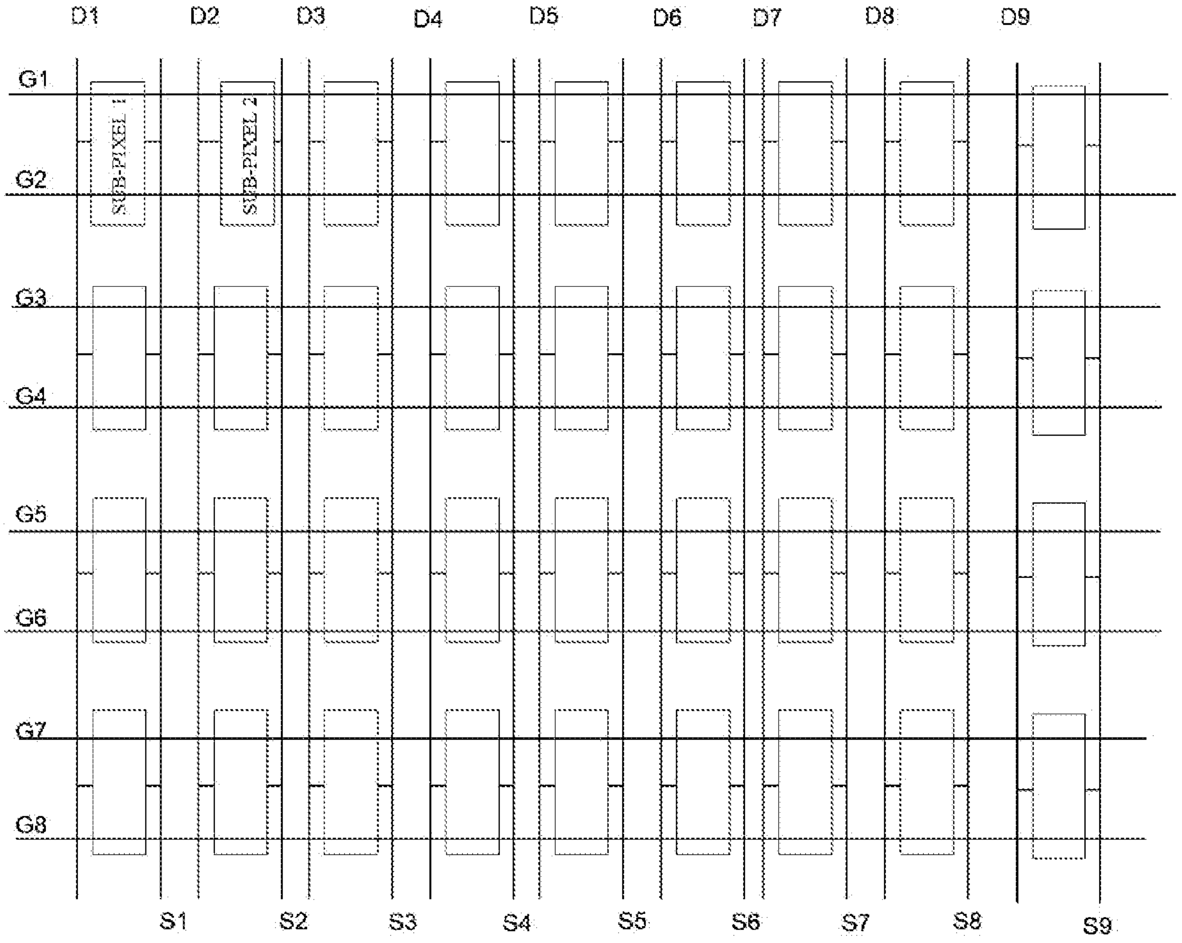
FIG. 2 is a schematic structure diagram of a traditional pixel unit.

In the pixel unit 10 of 3T1C architecture shown in FIG. 1, during the voltage sensing period, the existing T3 is controlled by the control signal line G2, and when the capacitor C finishes charging through the voltage Data on the data line, T2 is turned on; since the negative supply voltage signal VSS at the negative supply voltage terminal controls the light-emitting diode OLED not to emit light (by ensuring that the anode voltage–the cathode voltage<the cut-in voltage Vref), when T3 is turned on, the current flows from VDD, passes through T2 and T3, and reaches the sensor line. Thus, the current threshold voltage Vth of T2 may be calculated by using the Data voltage.

Figure 3:
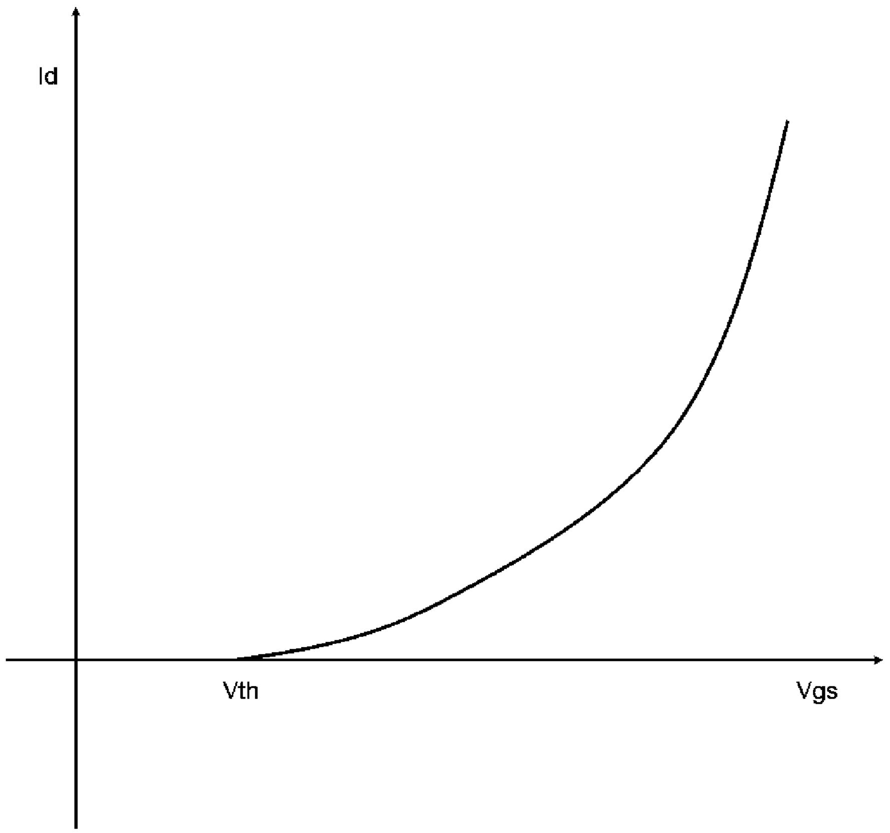
FIG. 3 is the input characteristic curve of a traditional transistor.

In this case, as shown in FIG. 3, which shows the relationship between the current Id and Vth, where Id is the current flowing through T2 and Vgs is the voltage difference between the source and the gate of T2, Vth is the voltage difference between the source and the gate of T2 when a current flows through T2 during the gradual increase of Data from small to large.

Regarding the driving architecture of the whole pixel unit 10, the current comes from the positive supply voltage signal VDD. To sense whether there is a current at the source of T2, it is also possible to sense whether there is a current at the drain of T2 (Id=Is). That is, in case where it is possible to change sensing whether there is a current at the source of T2 to sensing whether there is a current at the drain, the structures of T3, sensor line and control signal line G2 may be omitted, the areas occupied by the pixel unit 10 and the display panel 200 may be decreased, the structure of the display panel 200 may be simplified and the design cost may be reduced.

For this purpose, the first aspect of the embodiments of this disclosure provides a voltage compensation circuit 100, which determines the threshold voltage of the second transistor T2 by sensing the data signal Data at the moment when the second transistor T2 switches ON and OFF, i.e., the moment the current is generated.

The voltage compensation circuit 100 is applicable to the display panel 200, which includes multiple rows of scan lines, multiple columns of data lines and multiple pixel units 10 correspondingly connected with the scan lines and the data lines. The pixel units 10 are arranged in an array. Each scan line is connected with a row of pixel units 10, each data line is connected with a same column of pixel units 10 or with an adjacent column of pixel units 10. The pixel unit 10 includes a positive supply voltage terminal, a negative supply voltage terminal, a control terminal and a signal input terminal. The signal input terminal is connected with a data line and receives a data signal data of a corresponding voltage value. The control terminal is connected with a scan line and receives a corresponding row HIGH signal Vgh and row LOW signal. The positive supply voltage terminal and the negative supply voltage terminal are connected with the correspondingly power supply terminals of the power supply module, and receives the positive supply voltage signal VDD and the negative supply voltage signal VSS.

Figure 4:
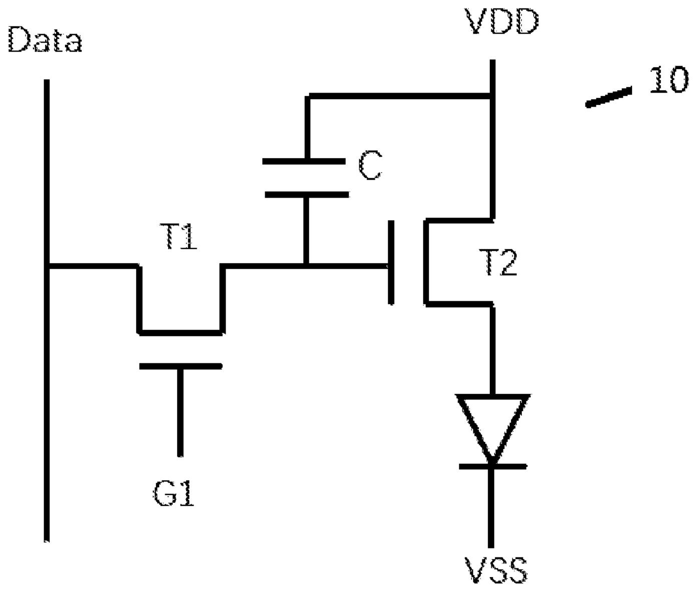
FIG. 4 is a schematic circuit diagram of a pixel unit provided in a first embodiment of this disclosure.

In this case, as shown in FIG. 4, the pixel unit 10 includes at least the first transistor T1, the second transistor T2, the capacitor C and the light-emitting diode OLED. The positive supply voltage terminals of the respective pixel units 10 are commonly connected, a first terminal of the first transistor T1 is connected to the data line, and the control terminal of the first transistor T1 is connected to the scan line. A second terminal of the first transistor T1, a first terminal of the capacitor C and the control terminal of the second transistor T2 are commonly connected. A second terminal of the capacitor C and a first terminal of the second transistor T2 are commonly connected to form the positive supply voltage terminal of the pixel unit 10. A second terminal of the second transistor T2 is connected to the anode of the light-emitting diode OLED, and the cathode of the light-emitting diode OLED is connected to the negative supply voltage terminal and receives the negative supply voltage signal VSS. In this case, the negative supply voltage signal VSS may be a ground signal or other reference voltage signal, whose specific voltage value is not limited.

Figure 5:
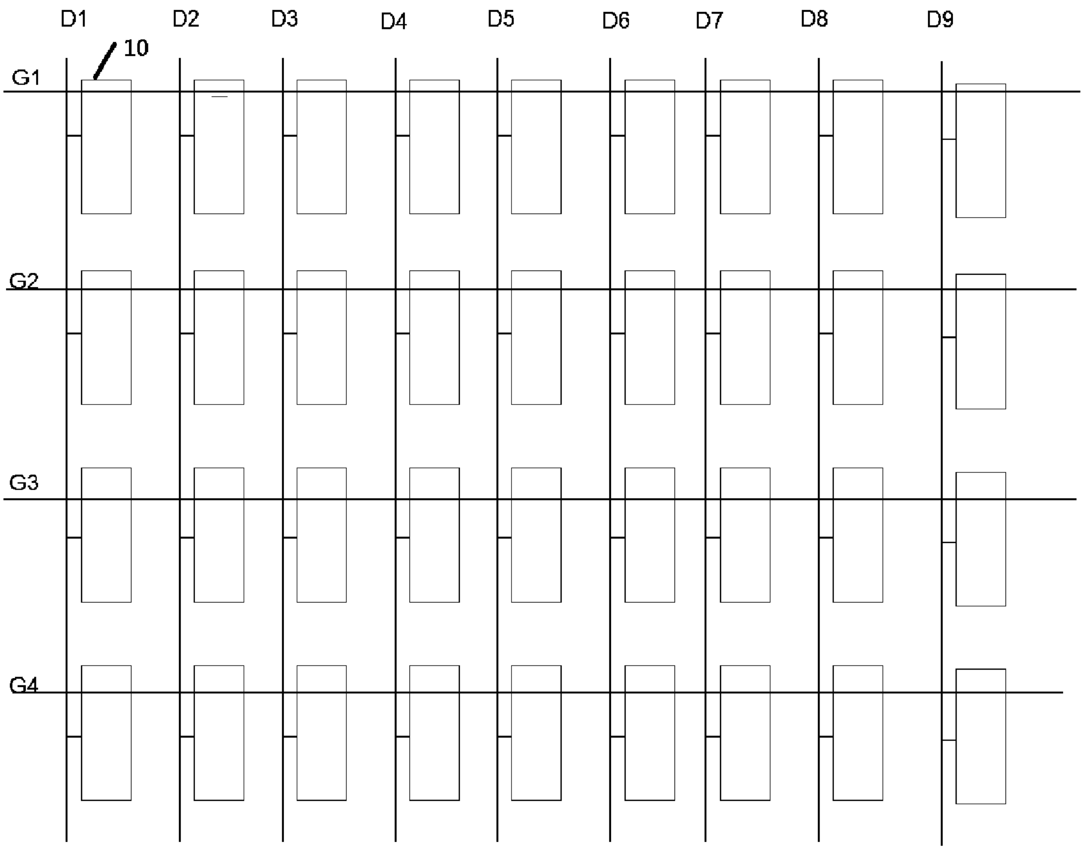
FIG. 5 is a schematic structure diagram of the pixel unit provided in the first embodiment of this disclosure.

That is, in this embodiment, the voltage compensation circuit 100 is applicable to the pixel unit 10 of a 2T1C structure. As shown in FIG. 5, the pixel unit 10 of the 2T1C structure does not have T3, the sensor line or the control signal line, which reduces the areas occupied by the pixel unit 10 and the display panel 200, simplifies the structure of the display panel 200 and reduces the design cost.

Figure 6:
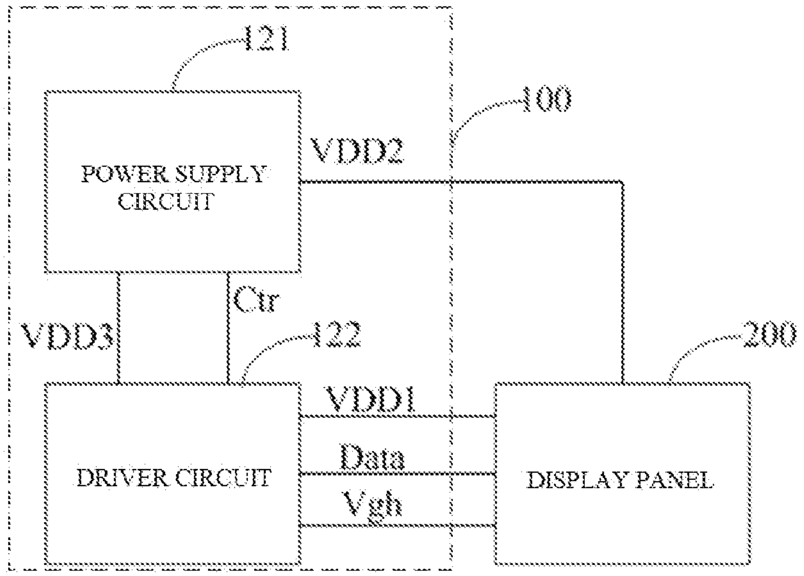
FIG. 6 is a schematic diagram of a first structure of a voltage compensation circuit provided in the first embodiment of this disclosure.
Figure 7:
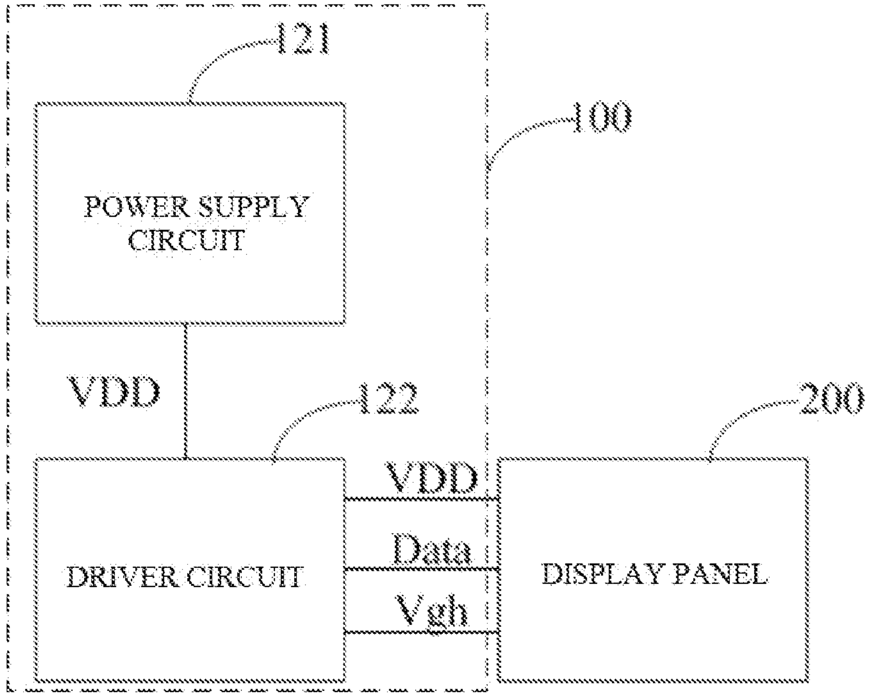
FIG. 7 is a schematic diagram of a second structure of the voltage compensation circuit provided in the first embodiment of this disclosure.

Meanwhile, in order to match the current pixel structure and obtain the corresponding threshold voltage, as shown in FIG. 6 or FIG. 7, the voltage compensation circuit 100 includes:

- a power supply circuit 121;
- a driver circuit 122, which is connected with the power supply circuit 121, the respective data lines, the respective scan lines and the positive supply voltage terminals of the pixel units, and the driver circuit 122 is used for:
- during a voltage sensing period, controlling the pixel units 10 to be powered on, and selectively controlling the first transistors T1 of the respective pixel units 10 to turn on in sequence, and outputting changed data signals Data to control the second transistors T2 of the respective pixel units 10 to switch from the OFF state to the ON state;
- sensing the voltage values of the data signals Data at the moment when the respective pixel units 10 switch the state, and determining the threshold voltages of the second transistors T2 of the respective pixel units 10 based on the data signals Data;
- during a voltage compensation period, controlling the pixel units 10 to be powered on and controlling the respective rows of pixel units 10 to turn on row by row, and outputting the voltage-compensated data signals Data to the respective pixel units 10 based on the threshold voltages of the second transistors T2 of the respective pixel units 10.

In this embodiment, the driver circuit 122 in the voltage compensation circuit 100 switches between a voltage sensing mode and a voltage compensation mode according to triggering instructions, and performs the corresponding voltage sensing and compensation output to the respective pixel units 10 of the display panel 200.

In this case, the voltage sensing period includes multiple consecutive voltage sensing sub-periods, that is, multiple voltage sensing periods for the multiple pixel units 10. After finishing the voltage sensing of one pixel unit 10, the drive circuit 122 switches to a next pixel unit 10 to perform the voltage sensing. That is, only one pixel unit 10 undergoes the voltage sensing during each voltage sensing sub-period.

In this embodiment, the row HIGH signals Vgh and the data signals Data are provided by the driver circuit 122. During the voltage sensing period, the driver circuit 122 outputs the positive supply voltage signal VDD to the commonly connected positive supply voltage terminals of the respective pixel units 10 to power on the pixel units 10; and simultaneously outputs the row HIGH signal Vgh and the data signal Data matching the pixel unit 10 to be sensed. The voltage of the data signal Data gradually increases from low to high. When receiving the row HIGH signal Vgh, the first transistor T1 of the pixel unit 10 is turned on. The Data signal Data is output to the capacitor C and to the second transistor T2 through the first transistor T1. At the moment when the capacitor C is charged to a preset voltage, the second transistor T2 is turned on. That is, the second transistor T2 remains cutoff when the data signal Data is a low voltage, and the second transistor T2 is turned on when the data signal Data increases to a certain voltage.

When the second transistor T2 is turned on, the positive supply voltage terminal, the second transistor T2, the light-emitting diode OLED are conductively connected to the negative supply voltage terminal to generate a current. And it may be determined whether the second transistor T2 has switched the state by sensing the moment when the current is generated (which is referred to as current generation time hereafter).

The driver circuit 122 obtains the current generation time through the commonly connected positive supply voltage terminals of the respective pixel units 10, so as to perform voltage sensing to the respective pixel units 10 in sequence, which reduces the sensing interference and improves the sensing accuracy.

After the voltage sensing, the driver circuit 122 switches to the voltage compensation mode, in which it does not need to perform voltage sensing, that is, not need to perform current sensing. At this time, the driver circuit 122 directly outputs the positive supply voltage signal VDD or outputs a control signal to control the power supply circuit 121 to output the positive supply voltage signal VDD to the commonly connected positive supply voltage terminals of the respective pixel units 10, so as to power on the pixel units 10; and outputs the data signals Data with addition of the voltage compensation and a row scanning signal, so that the pixel units 10 receive the corresponding data signals Data and communicate current signals matching the brightness. Each light-emitting diode OLED displays normally with its own preset brightness, and displays in different frames with brightness with a preset change, so as to form corresponding image information.

The data signal Data output by the driver circuit 122 may gradually increase from a preset low voltage, or from zero voltage, and the specific voltage range is not limited.

In this case, during the voltage compensation period, it is possible to accordingly set the connection relationship between the power supply circuit 121 and the pixel units 10 according to the different power-on of the pixel units 10. The power supply circuit 121 may be connected respectively with the driver circuit 122 and the pixel units 10, or connected with the pixel units 10 through the driver circuit 122. That is, the power supply circuit 121 is connected to the positive supply voltage terminals of the pixel units 10 through the driver circuit 122, or the power supply circuit 121 is directly connected to the positive supply voltage terminals of the pixel units 10.

In case where the power supply circuit 121 may be connected respectively with the driver circuit 122 and the pixel units 10, as shown in FIG. 6, during the voltage sensing period, the power supply circuit 121 outputs the positive supply voltage signal VDD to the driver circuit 122, and the positive supply voltage signal VDD is output to the pixel units 10 through the driver circuit 122; the driver circuit 122 determines the time point when the second transistor T2 switches by sensing the current change generated by the positive supply voltage signal VDD; and during the voltage compensation period, the power supply circuit 121 outputs the positive supply voltage signal VDD to the pixel units 10, and the operating power is provided by the power supply circuit 121, while the driver circuit 122 does not output any power signal.

And in case where the power supply circuit 121 is only connected with the driver circuit 122, as shown in FIG. 7, during the voltage sensing period, the power supply circuit 121 outputs the positive supply voltage signal VDD to the driver circuit 122, and the positive supply voltage signal VDD is output to the pixel units 10 through the driver circuit 122; the driver circuit 122 determines the time point when the second transistor T2 switches by sensing the current change generated by the positive supply voltage signal VDD; and during the voltage compensation period, the driver circuit 122 outputs the positive supply voltage signal VDD again to the pixel units 10, and the operating power is provided by the driver circuit 122, which simplifies the wiring relationship between the power supply circuit 121, the driver circuit 122 and the pixel units 10. Through this arrangement, the structure of the power supply circuit 121 is simplified, and it is not necessary to arrange multiple positive supply voltage terminals or a power conversion unit for the power supply circuit 121.

Second Embodiment

Figure 8:
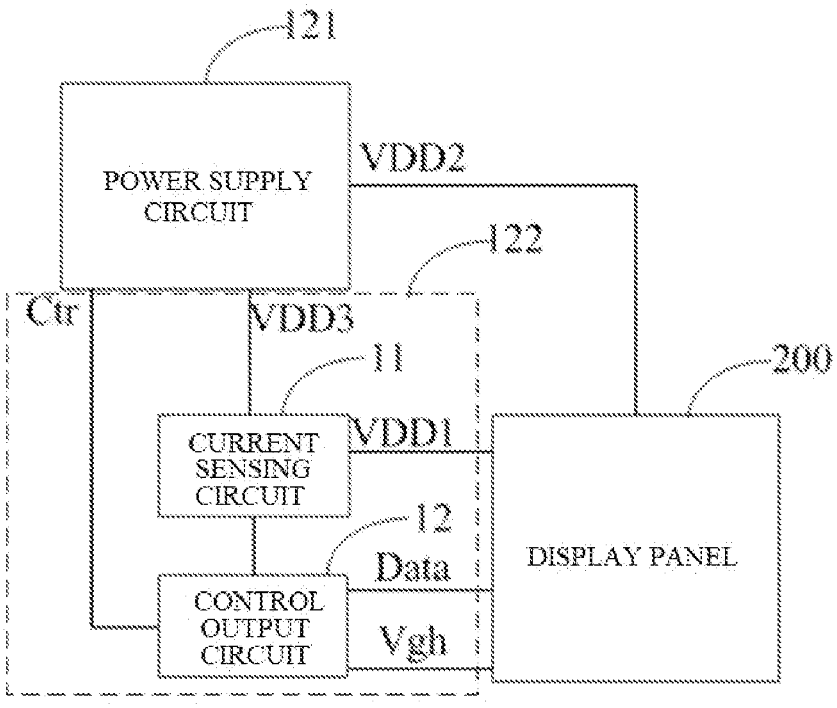
FIG. 8 is a schematic structure diagram of a voltage compensation circuit provided in a second embodiment of this disclosure.

The specific structure of the driver circuit may vary according to the different driving modes of the driver circuit 122. In an optional embodiment, in case where the power supply circuit 121 is connected respectively to the driver circuit 122 and the pixel units 10, as shown in FIG. 8, the driver circuit 122 optionally includes:

a current sensing circuit 11, which is connected between the power supply circuit 121 and the positive supply voltage terminals of the pixel units 10; the current sensing circuit 11 is used for: during the voltage sensing period, outputting a current feedback signal representing that the second transistor T2 of the pixel unit 10 has switched the state when sensing a current of the positive supply voltage signal VDD;

a control output circuit 12, which is connected with the power supply circuit 121, the respective data lines, the respective scan lines and the current sensing circuit 11, and the output circuit 12 is used for:

during the voltage sensing period, outputting a first control signal to the power supply circuit 121, so that the power supply circuit 121 outputs the positive supply voltage signal VDD, which is output to the positive supply voltage terminals of the pixel units 10 through the current sensing circuit 11;

outputting a row HIGH signal Vgh to turn on the first transistor T1 of a corresponding pixel unit 10, so as to select and control the pixel units 10 in sequence for performing the voltage sensing, and during the voltage sensing period of each pixel unit 10, outputting a changed data signal Data to control the second transistor T2 of the pixel unit 10 to switch from the OFF state to the ON state;

sensing, when receiving the current feedback signal, the voltage value of the data signal Data at the moment when the sensed state is switched; and determining the threshold voltage of the second transistor T2 of the pixel unit 10 during each voltage sensing period based on the data signal Data;

during the voltage compensation period, controlling the power supply circuit 121 to output the positive supply voltage signal VDD to the positive supply voltage terminals of the pixel units 10, and controlling the respective rows of pixel units 10 to turn on row by row, and outputting the voltage-compensated data signals Data to the respective pixel units 10 based on the threshold voltages of the second transistors T2 of the respective pixel units 10.

In this embodiment, the control output circuit 12 completes the controlling of the power supply circuit 121 and the outputting of the corresponding data signals Data and the row HIGH signals Vgh. That is, during the voltage sensing period, the control output circuit 12 controls the power supply circuit 121 to output the positive supply voltage signal VDD to the current sensing circuit 11, the positive supply voltage signal VDD is output to the commonly connected positive supply voltage terminals of the respective pixel units 10 through the current sensing circuit 11; and simultaneously the control output circuit 12 outputs the row HIGH signal Vgh and the data signal Data matching the pixel unit 10 to be sensed. The voltage of the data signal Data gradually increases from low to high. When receiving the row HIGH signal Vgh, the first transistor T1 of the pixel unit 10 is turned on. The Data signal Data is output to the capacitor C and to the second transistor T2 through the first transistor T1. At the moment when the capacitor C is charged to a preset voltage, the second transistor T2 is turned on. That is, the second transistor T2 remains cutoff when the data signal Data is a low voltage, and the second transistor T2 is turned on when the data signal Data increases to a certain voltage.

When the second transistor T2 is turned on, the positive supply voltage terminal, the second transistor T2, the light-emitting diode OLED are conductively connected to the negative supply voltage terminal to generate a current. The current sensing circuit 11 senses the current generation time, and outputs the current feedback signal to the control output circuit 12, and thus the control output circuit 12 may determine whether the second transistor T2 has switched the state.

The current sensing circuit 11 obtains the current generation time through the commonly connected positive supply voltage terminals of the respective pixel units 10, so as to perform voltage sensing to the respective pixel units 10 in sequence, which reduces the sensing interference and improves the sensing accuracy.

After the voltage sensing, the control output circuit 12 switches to the voltage compensation mode, in which it does not need to perform voltage sensing, that is, not need to perform current sensing. The control output circuit 12 outputs the control signal to control the power supply circuit 121 to output the positive supply voltage signal VDD while there is no positive supply voltage VDD inputted to the control output circuit 12, and outputs the data signals Data with addition of the voltage compensation and a row scanning signal, so that the pixel units 10 receive the corresponding data signals Data and communicate current signals matching the brightness. Each light-emitting diode OLED displays normally with its own preset brightness, and displays in different frames with brightness with a preset change, so as to form corresponding image information.

Third Embodiment

Figure 9:
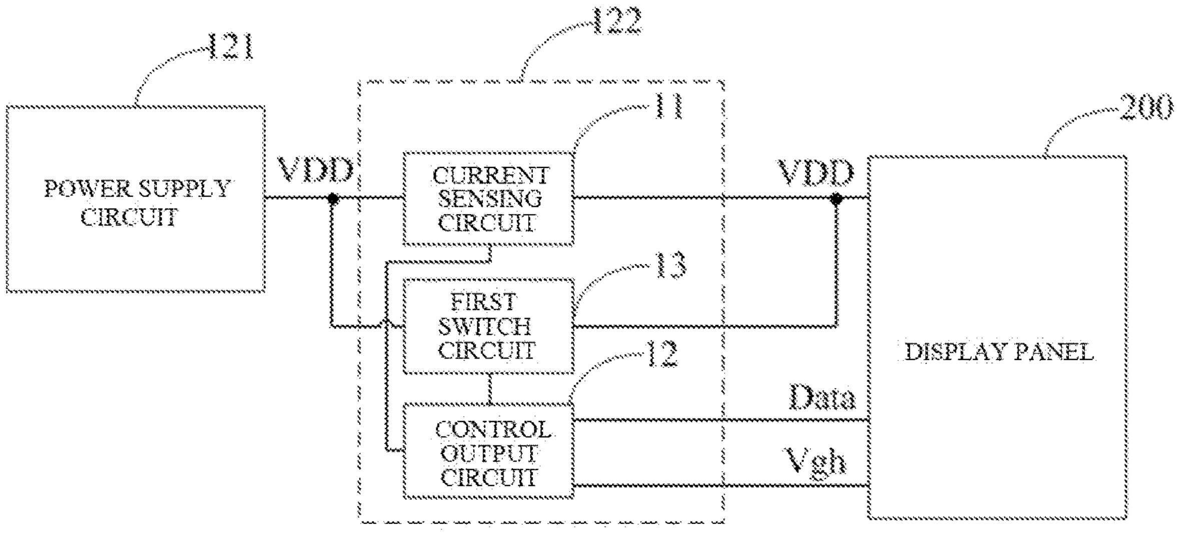
FIG. 9 is a schematic diagram of a first structure of a voltage compensation circuit provided in a third embodiment of this disclosure.

In another optional embodiment, in case where the power supply circuit 121 is connected to the pixel units 10 through the driver circuit 122, as shown in FIG. 9, the driver circuit 122 optionally includes:

- a current sensing circuit 11, which is connected between the power supply circuit 121 and the positive supply voltage terminals of the pixel units 10; the current sensing circuit 11 is used for: during the voltage sensing period, outputting a current feedback signal representing that the second transistor T2 of the pixel unit 10 has switched the state when sensing a current of the positive supply voltage signal VDD;
- a first switch circuit 13, which is connected with the current sensing circuit 11 in parallel;
- a control output circuit 12, which is connected with the power supply circuit 121, the respective data lines, the respective scan lines, the current sensing circuit 11 and the first switch circuit 13, and the control output circuit 12 is used for:
- during the voltage sensing period, outputting a switching-off signal to control the first switch circuit 13 to switch off, so that the positive supply voltage signal VDD is output to the positive supply voltage terminals of the pixel units 10 through the current sensing circuit 11;
- outputting a row HIGH signal Vgh to turn on the first transistor T1 of a corresponding pixel unit 10, so as to select and control the respective pixel units 10 in sequence for performing the voltage sensing, and during the voltage sensing period of each pixel unit 10, outputting a changed data signal Data to control the second transistor T2 of the pixel unit 10 to switch from the OFF state to the ON state;
- sensing, when receiving the current feedback signal, the voltage value of the data signal Data at the moment when the sensed state is switched; and determining the threshold voltages of the second transistor T2 of the pixel unit 10 during each voltage sensing period based on the data signal Data;
- during the voltage compensation period, outputting a switching-on signal to control the first switch circuit 13 to switch on, so that the positive supply voltage signal VDD is output to the positive supply voltage terminals of the pixel units 10 through the first switch circuit 13, and controlling the respective rows of pixel units 10 to turn on row by row, and outputting the voltage-compensated data signals Data to the respective pixel units 10 based on the threshold voltages of the second transistors T2 of the respective pixel units 10.

In this embodiment, the power input terminal of the control output circuit 12 is connected to the power output terminal of the power supply circuit 121. During the voltage sensing period, the control output circuit 12 controls the first switch circuit 13 to switch off, and the power supply circuit 121 outputs the positive supply voltage signal VDD to the current sensing circuit 11. The positive supply voltage signal VDD is output to the commonly connected positive supply voltage terminals of the respective pixel units 10 through the current sensing circuit 11; and simultaneously the control output circuit 12 outputs the row HIGH signal Vgh and the data signal Data matching the pixel unit 10 to be sensed. The voltage of the data signal Data gradually increases from low to high. When receiving the row HIGH signal Vgh, the first transistor T1 of the pixel unit 10 is turned on. The Data signal Data is output to the capacitor C and to the second transistor T2 through the first transistor T1. At the moment when the capacitor C is charged to a preset voltage, the second transistor T2 is turned on. That is, the second transistor T2 remains cutoff when the data signal Data is a low voltage, and the second transistor T2 is turned on when the data signal Data increases to a certain voltage.

When the second transistor T2 is turned on, the positive supply voltage terminal, the second transistor T2, the light-emitting diode OLED are conductively connected to the negative supply voltage terminal to generate a current. The current sensing circuit 11 senses the current generation time, and outputs the current feedback signal to the control output circuit 12, and thus the control output circuit 12 may determine whether the second transistor T2 has switched the state.

The current sensing circuit 11 obtains the current generation time through the commonly connected positive supply voltage terminals of the respective pixel units 10, so as to perform voltage sensing to the respective pixel units 10 in sequence, which reduces the sensing interference and improves the sensing accuracy.

After the voltage sensing, the control output circuit 12 switches to the voltage compensation mode, in which it does not need to perform voltage sensing, that is, not need to perform current sensing. The control output circuit 12 controls the first switch circuit 13 to switch on and short-circuits the current sensing circuit 11, so that the positive supply voltage signal VDD is directly output to the commonly connected positive supply voltage terminals of the respective pixel units 10 through the first switch circuit 13; and simultaneously the control output circuit 12 outputs the data signals Data with addition of the voltage compensation and a row scanning signal, so that the pixel units 10 receive the corresponding data signals Data and communicate current signals matching the brightness. Each light-emitting diode OLED displays normally with its own preset brightness, and displays in different frames with brightness with a preset change, so as to form corresponding image information.

Figure 10:
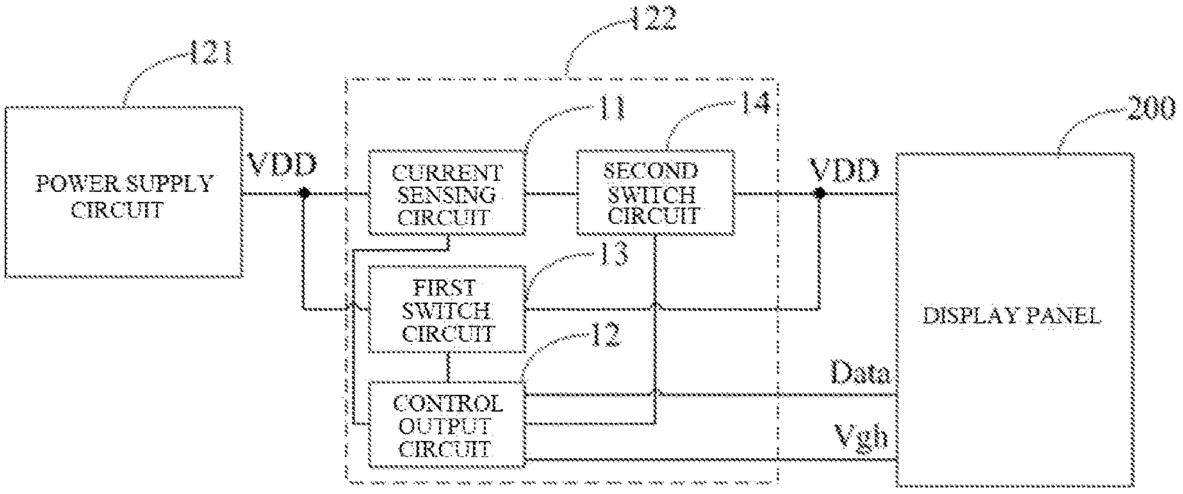
FIG. 10 is a schematic diagram of a second structure of the voltage compensation circuit provided in the third embodiment of this disclosure.

In order to avoid a current loop in the current sensing circuit 11 and a resulted excessive current output from the power supply circuit 121 to the pixel units 10, as shown in FIG. 10, the driver circuit optionally includes a second switch circuit 14. The second switch circuit 14 and the current sensing circuit 11 are connected in series between the power supply circuit 121 and the positive supply voltage terminals of the pixel units 10. The second switch circuit 14 is also connected to the control output circuit 12;

the control output circuit 12 is also used for:

- during the voltage sensing period, outputting a switching-on signal to control the second switch circuit 14 to switch on; and during the voltage compensation period, outputting a switching-off signal to control the second switch circuit 14 to switch off.

That is, during the voltage sensing period, the power supply circuit 121 outputs the positive supply voltage signal VDD to the display panel 200 through the current sensing circuit 11, the second switch circuit 14; at this time, the current sensing circuit 11 senses the current of the positive supply voltage signal VDD, and outputs the current feedback signal, so as to determine the moment when second transistor T2 state switches the state; besides, during the voltage compensation period, the second switch circuit 14 switches off, and cuts off the current loop before the current sensing circuit 11 and the display panel 200, which ensures that the current output from the power supply circuit 121 to the pixel units 10 is in a preset current range, and improves the operational reliability of the pixel units 10.

In this case, the above power supply circuit 121, control output circuit 12, first switch circuit 13, second switch circuit 14 may be integrally or separately disposed. That is, they may be the respective power chip, driver chip and switch chip, or integrated into one same chip, the specific type of which is not limited.

In this case, depending on its output row HIGH signal Vgh and data signal Data, the control output circuit 12 may include a data driver circuit 122, a scan driver circuit 122, a timing controller and other structures, and the specific structure is not limited.

The current sensing circuit 11 may use a transformer, a sampling resistance and other structures, and the specific structure is not limited.

Fourth Embodiment

Corresponding to the above voltage compensation circuit 100, a second aspect of the embodiments of this disclosure provides a voltage compensation method applicable to the above display panel 200 and voltage compensation circuit 100, in which, as shown in FIG. 4, the pixel unit 10 includes at least the first transistor T1, the second transistor T2, the capacitor C and the light-emitting diode OLED. The positive supply voltage terminals of the respective pixel units 10 are commonly connected, the first terminal of the first transistor T1 is connected to the data line, and the control terminal of the first transistor T1 is connected to the scan line. The second terminal of the first transistor T1, the first terminal of the capacitor C and the control terminal of the second transistor T2 are commonly connected. The second terminal of the capacitor C and the first terminal of the second transistor T2 are commonly connected to form the positive supply voltage terminal of the pixel unit 10. The second terminal of the second transistor T2 is connected to the anode of the light-emitting diode OLED, and the cathode of the light-emitting diode OLED is connected to the negative supply voltage terminal and receives the negative supply voltage signal VSS. In this case, the negative supply voltage signal VSS may be a ground signal or other reference voltage signal, whose specific voltage value is not limited.

That is, in this embodiment, the voltage compensation method is applicable to the pixel unit 10 of a 2T1C structure. The pixel unit 10 of the 2T1C structure does not have T3, the sensor line or the control signal line, which reduces the areas occupied by the pixel unit 10 and the display panel 200, simplifies the structure of the display panel 200 and reduces the design cost.

Figure 11:
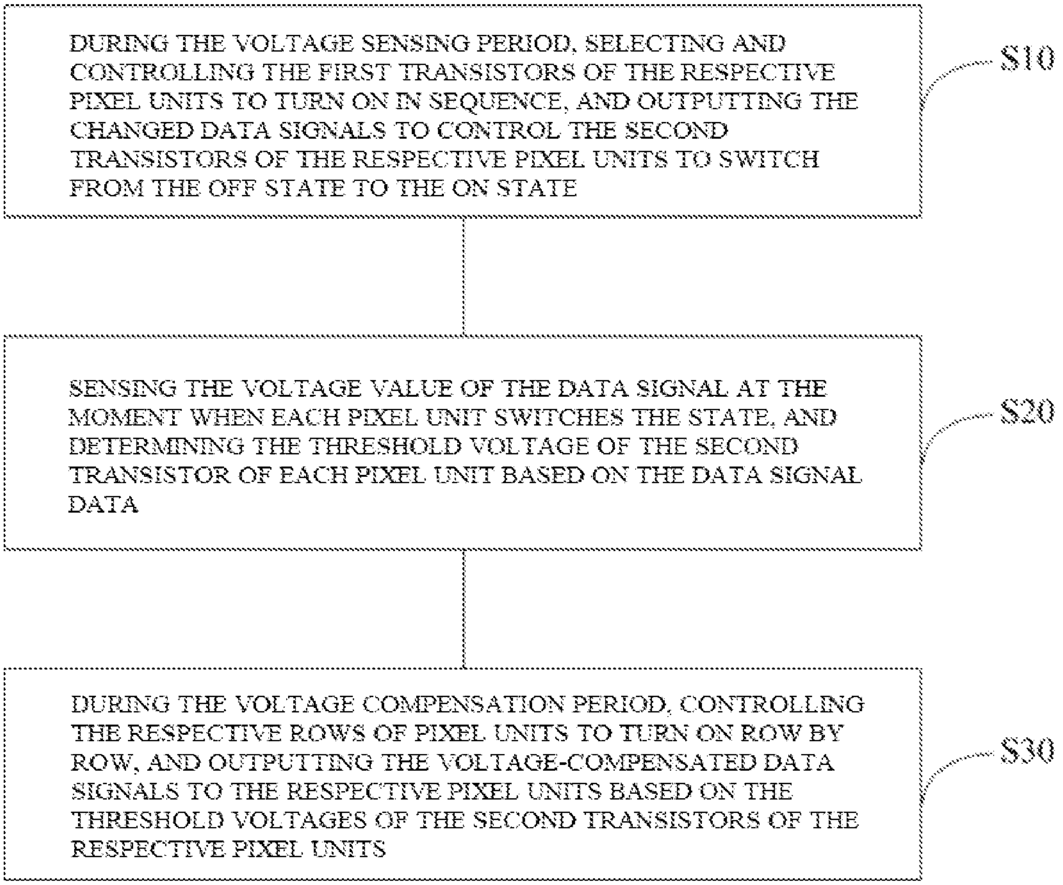
FIG. 11 is a flow chart of a first process of a voltage compensation method provided in a fourth embodiment of this disclosure.

Meanwhile, in order to match the current pixel structure and obtain the corresponding threshold voltage, as shown in FIG. 11, the voltage compensation method includes:

S10, during the voltage sensing period, selecting and controlling the first transistors T1 of the respective pixel units 10 to turn on in sequence, and outputting the changed data signals Data to control the second transistors T2 of the respective pixel units 10 to switch from the OFF state to the ON state.

In this case, the voltage sensing period includes multiple consecutive voltage sensing sub-periods, that is, multiple voltage sensing periods for the multiple pixel units 10. After finishing the voltage sensing of one pixel unit 10, the method switches to a next pixel unit 10 to perform the voltage sensing. That is, only one pixel unit 10 undergoes the voltage sensing during each voltage sensing sub-period.

After the voltage sensing starts, the row HIGH signal Vgh and the data signal Data matching the pixel unit 10 to be sensed are output. The voltage of the data signal Data gradually increases from low to high. When receiving the row HIGH signal Vgh, the first transistor T1 of the pixel unit 10 is turned on. The Data signal Data is output to the capacitor C and to the second transistor T2 through the first transistor T1. At the moment when the capacitor C is charged to the preset voltage, the second transistor T2 is turned on. That is, the second transistor T2 remains cutoff when the data signal Data is a low voltage, and the second transistor T2 is turned on when the data signal Data increases to a certain voltage. For example, to sense the threshold voltage of a pixel unit 10 in the $1^{st}$ row and $2^{nd}$ column, at this time, the first transistors T1 of all the pixel units 10 in the $1^{st}$ row are synchronously turned on through a row HIGH signal Vgh output by the scan line connected to the multiple pixel units 10 in the $1^{st}$ row, at the same time, the second transistor T2 of pixel unit 10 switches from the OFF state to the ON state through the changed data signal Data output by the data line connected to the pixel unit 10 to the second transistor T2.

In this case, the data signal Data may gradually increase from a preset low voltage, or gradually increase from zero voltage, and the specific voltage range is not limited.

When the second transistor T2 is turned on, the positive supply voltage terminal, the second transistor T2, the light-emitting diode OLED are conductively connected to the negative supply voltage terminal to generate a current. And it may be determined whether the second transistor T2 has switched the state by sensing the current generation time.

By obtaining the current generation time through the commonly connected positive supply voltage terminals of the respective pixel units 10, so as to perform voltage sensing to the respective pixel units 10 in sequence, the sensing interference is reduced and the sensing accuracy is improved.

S20, sensing the voltage value of the data signal Data at the moment when each pixel unit 10 switches the state, and determining the threshold voltage of the second transistor T2 of each pixel unit 10 based on the data signal Data;

sensing the voltage value of the Data signal Data when the state is switched, and determining the threshold voltage of the second transistor T2 of the pixel unit 10 during each voltage sensing period based on the data signal Data when the state is switched.

After determining the moment when the second transistor T2 of the current pixel unit 10 switches the state through the sensing current generation time, the threshold voltage of the second transistor T2 of the pixel unit 10 may be determined by detecting or reading the voltage value of the input data signal Data of the pixel unit 10 and recording the voltage value of the current data signal Data.

By selecting different pixel units 10 in order to perform the voltage sensing, it is possible to determine the threshold voltages of the respective pixel units 10, and respectively record them and form a data table, so that corresponding voltage compensation may be made according to the data table during the voltage compensation period.

S30, during the voltage compensation period, controlling the respective rows of pixel units 10 to turn on row by row, and outputting the voltage-compensated data signals Data to the respective pixel units 10 based on the threshold voltages of the second transistors T2 of the respective pixel units 10.

After the voltage sensing, the method switches to the voltage compensation mode. During the voltage compensation period, the row HIGH signals Vgh are output to control the respective rows of pixel units 10 to turn on row by row; and at the moment when each row of pixel units 10 turns on, the data signals Data with addition of the respective voltage compensations are output by multiply columns of data lines to the respective columns of pixel units 10, so that the pixel units 10 receive the corresponding data signals Data and communicate current signals matching the brightness. Each light-emitting diode OLED displays normally with its own preset brightness, and displays in different frames with brightness with a preset change, so as to form corresponding image information.

Besides, the respective pixel units 10 may be selected in a time order according to the needs. They may be successively selected in rows or in columns. Optionally, the step of selecting and controlling the first transistors T1 of the respective pixel units 10 to turn on in sequence includes:

S11, during the voltage sensing period, outputting the row HIGH signals Vgh to the first transistors T1 of the respective rows of pixel units 10 row by row, and selecting each row of pixel units 10 to perform the voltage sensing in sequence during the output time period of each row HIGH signal Vgh to each row.

In step S11, a row of pixel units 10 is taken as a group. After the sensing of each group of pixel units 10, switch to the next group of pixel units 10. For example, when the $1^{st}$ row of pixel units 10 are sensed, the voltage sensing time period for each pixel unit 10 is T; assuming that each row includes n pixel units 10, the time period when the $1^{st}$ row HIGH signal is output is n*T; and in each time period T, one pixel unit 10 in the $1^{st}$ row is selected, and the changed data signal Data is output, so that the second transistor T2 of the pixel unit 10 switches from the OFF state to the ON state, and the current generation moment and the corresponding data signal Data are sensed, so as to determine the threshold voltage of the pixel unit 10; and at the end of the time period n*T, the sensing of the threshold voltages of the $1^{st}$ row of pixel units 10 is completed, and the selecting and sensing of the threshold voltages of the respective pixel units 10 in another row is completed in a next time period n*T.

In this case, there is no limitation on the time order of voltage sensing the multiple pixel units 10 in each row, which may be sensed sequentially or at intervals. For example, in the n pixel units 10 in the first row, the first one to be sensed is the pixel unit 10 in the first column, the second one to be sensed is the pixel unit 10 in the second column or the pixel unit 10 in the third column or any other pixel unit 10. Similarly, the time order of sensing the respective rows of pixel units 10 is not limited. For example, in the first time period n*T, the voltage sensing is performed to the $1^{st}$ row of pixel units 10, and in the next time period n*T, the voltage sensing is performed to the $2^{nd}$ row of pixel units 10 or the $3^{rd}$ row of pixel units 10, or any other row of pixel units 10.

S12, alternatively, during the voltage sensing period, taking a column of pixel units 10 as a pixel groups, and outputting the row HIGH signals Vgh row by row in each frame to the respective pixel units 10 in a corresponding pixel group, so as to select and control the respective pixel units 10 of the respective pixel groups to perform the voltage sensing.

In step S12, a column of pixel units 10 is taken as a group. After sensing each group of pixel units 10, that is, after the end of a frame, switch to the next group of pixel units 10 in the next frame. For example, in the first frame, the $1^{st}$ column of pixel units 10 are sensed, and the voltage sensing time period for each pixel unit 10 is T; assuming that each column includes n pixel units 10, the time period when the 1 st column HIGH signal is output is n*T, that is, the sensing time period for each frame is n*T; and in each time period T, one pixel unit 10 in the $1^{st}$ column is selected, and the changed data signal Data is output, so that the second transistor T2 of the pixel unit 10 switches from the OFF state to the ON state, and the current generation moment and the corresponding data signal Data are sensed, so as to determine the threshold voltage of the pixel unit 10; and at the end of the time period n*T, the sensing of the threshold voltages of the $1^{st}$ column of pixel units 10 is completed, and the selecting and sensing of the threshold voltages of the respective pixel units 10 in another column is completed in a next time period n*T.

In this case, there is no limitation on the time order of voltage sensing the multiple pixel units 10 in each column, which may be sensed sequentially or at intervals. For example, in the n pixel units 10 in the first column, the first one to be sensed is the pixel unit 10 in the first row, the second one to be sensed is the pixel unit 10 in the second row or the pixel unit 10 in the third column or any other pixel unit 10. Similarly, the time order of sensing the respective columns of pixel units 10 is not limited. For example, in the first time period n*T, the voltage sensing is performed to the $1^{st}$ column of pixel units 10, and in the next time period n*T, the voltage sensing is performed to the $2^{nd}$ column of pixel units 10 or the $3^{rd}$ column of pixel units 10, or any other column of pixel units 10A.

Figure 12:
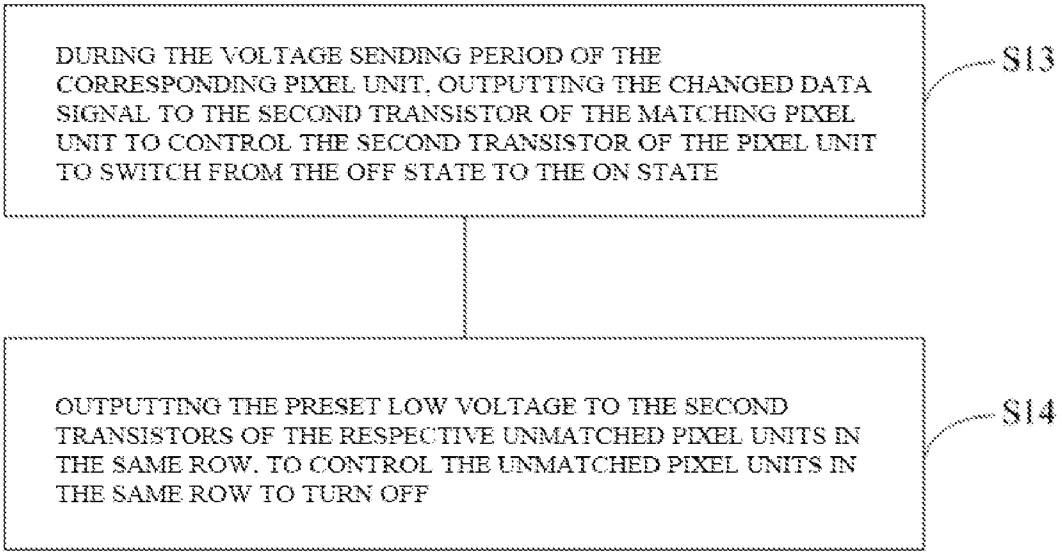
FIG. 12 is a flow chart of step S10 in the voltage compensation method shown in FIG. 11.

Besides, when the pixel unit 10 to be sensed receives the data signal Data, other pixel units 10 in the same row may receive no data signal Data or receive a preset LOW voltage. That is, other pixel units 10 in the same row remain the OFF state. Optionally, as shown in FIG. 12, during the voltage sensing period of each pixel unit 10, the step of outputting the changed data signal Data to control the second transistor T2 of the pixel unit 10 to switch from the OFF state to the ON state includes:

S13, during the voltage sending period of the corresponding pixel unit 10, outputting the changed data signal Data to the second transistor T2 of the matching pixel unit 10 to control the second transistor T2 of the pixel unit 10 to switch from the OFF state to the ON state;

S14, outputting the preset LOW voltage to the second transistors T2 of the respective unmatched pixel units 10 in the same row, to control the unmatched pixel units 10 in the same row to turn off.

That is, when the multiple pixel units 10 in one row receive the row HIGH signal Vgh, the first transistors T1 of the respective pixel units 10 is turned on, and the data line and the control terminal of the second transistor T2 are conductively connected through the first transistor T1. In order to perform voltage sensing to the corresponding pixel unit 10 in the row, the data line connected with the pixel unit 10 input the changed data signal Data; driven by the changed data signal Data, the second transistor T2 of the pixel unit 10 switches from the OFF state to the ON state, and obtains the current generation time through the commonly connected positive supply voltage terminals of the respective pixel units 10, to complete the voltage sensing of the pixel unit 10. Besides, in order to reduce the sensing interference and improve the sensing accuracy, the data lines of the other unmatched pixel units 10 in the row receives the preset LOW voltage, and the second transistors T2 of the other unmatched pixel units 10 in the row remain the OFF state. At the same time, only one pixel unit 10 generates a current signal. Thereby, the voltage sensing are performed to the respective pixel units 10 in sequence, the sending interference is reduce, and the sensing accuracy is improved.

Figure 13:
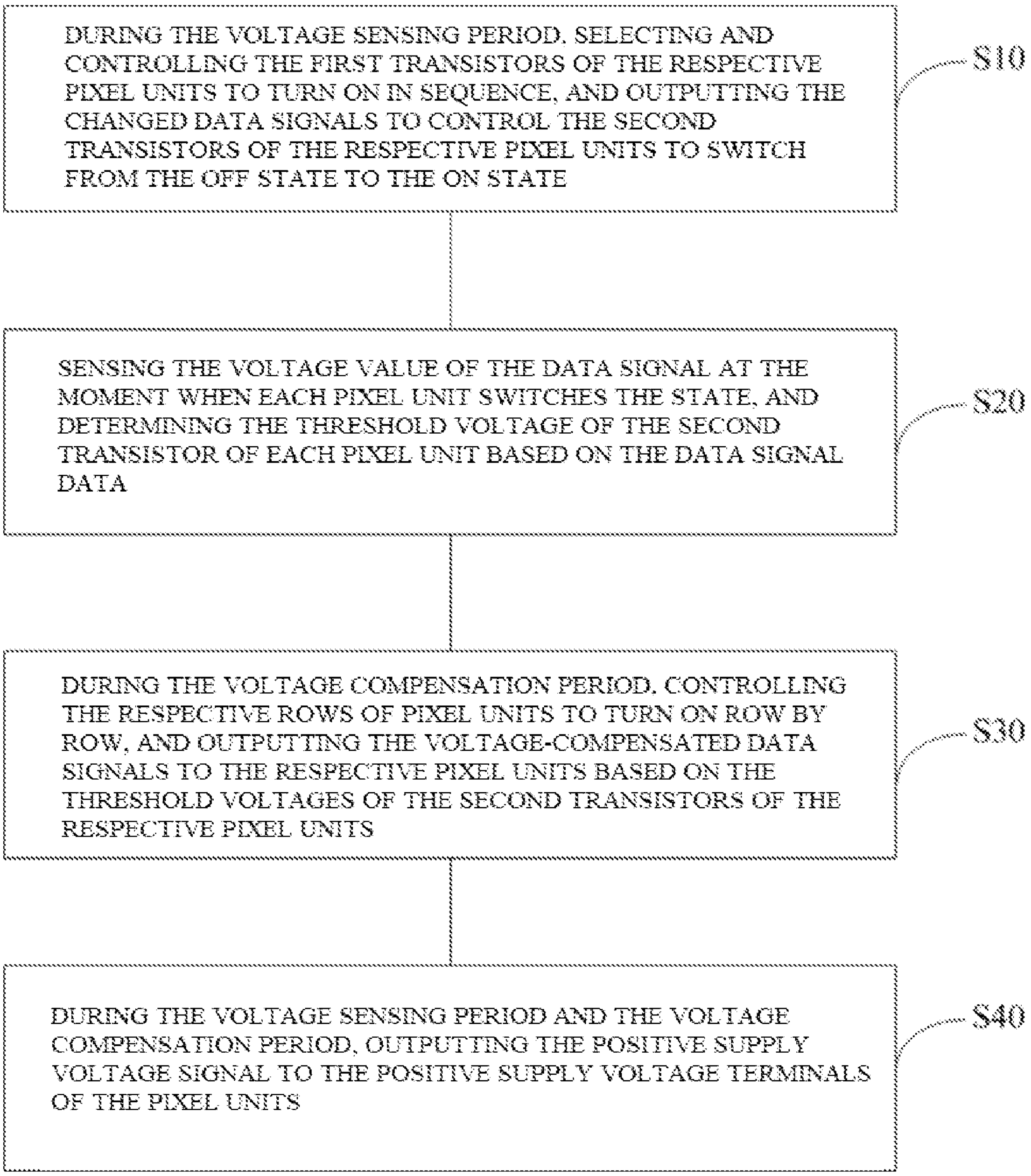
FIG. 13 is a flow chart of a second process of the voltage compensation method provided in the fourth embodiment of this disclosure.

Further, to further improve the sensing accuracy of state switching, as shown in FIG. 13, the voltage compensation method optionally further includes:

S40, during the voltage sensing period and the voltage compensation period, outputting the positive supply voltage signal VDD to the positive supply voltage terminals of the pixel units 10.

In this case, in the preset voltage sensing period, the output positive supply voltage signal VDD is used to generate a current signal of a corresponding voltage value through the light-emitting diode OLED at the moment when the second transistor T2 is turned on. The current signal is used to feedback the state switching of the current second transistor T2; and in the preset voltage sensing period, the output positive supply voltage signal VDD is used to generate a current signal of a corresponding voltage value through the light-emitting diode OLED at the moment when the second transistor T2 is turned on, and the current signal is used to drive the light-emitting diode OLED to display with a corresponding brightness.

In this case, in the two different time periods, the positive supply voltage signal VDD may be provided by one same module or different modules, which may be selected according to the specific arranged sensing circuit structure.

It should be understood that the sequence number of the steps in the above embodiments does not imply the order of execution. The procedures' execution order shall be determined by its function and internal logic and shall not constitute any limitation on the process of implementation in the embodiments of this disclosure.

Fifth Embodiment

Figure 14:
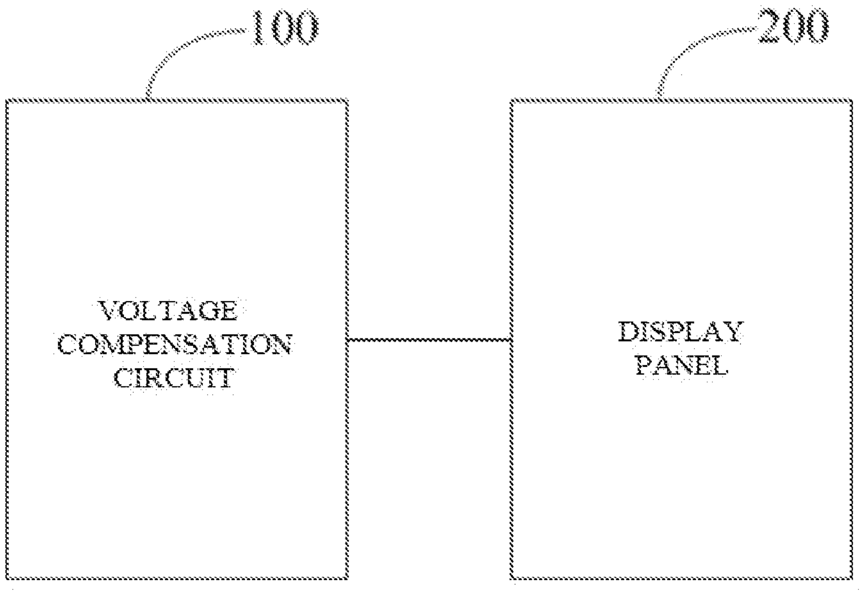
FIG. 14 is schematic structure diagram of a display device provided in a fifth embodiment of this disclosure.

As shown in FIG. 14, this disclosure also provides a display device, which includes a display panel 200 and a voltage compensation circuit 100. For the specific structure of the voltage compensation circuit 100 one may refer to the above embodiments. Since this display device adopts all the technical solutions of the above embodiments, it has at least all the beneficial effects brought by the technical solutions of the above embodiments, which will be repeated here. In this case, the voltage compensation circuit 100 is correspondingly connected to the display panel 200, and the voltage compensation circuit 100 is arranged on the display panel 200 or separated from the display panel 200.

In this case, depending on its output row HIGH signal Vgh and data signal Data, the voltage compensation circuit 100 may include a data driver circuit 122, a scan driver circuit 122, a timing controller, and other structures, and the specific structure is not limited.

The voltage compensation circuit 100 is applicable to the pixel unit 10 of the 2T1C structure, which constitutes the display panel 200. During the voltage sensing period, the changed data signal Data is adjusted and output to the pixel unit 10, and the data signal Data is sensed at the turning-on moment of the second transistor T2 of the pixel unit, and the threshold voltage is determined according to the voltage value of the data signal Data at the turning-on moment; and during the voltage compensation period, the voltage value of the compensated data signal Data is determined according to the threshold voltage value and output to the corresponding pixel unit 10. There is no need to arrange T3, the sensor line or the control signal line, the structure of the display panel 200 is simplified and the design cost is reduced.

The voltage compensation circuit 100 may be bonded on the display panel 200 according to the different driving architecture of the display panel 200, or additionally integrated outside the display panel 200 and connected to the display panel 200 through a flexible circuit board or signal lines and etc. There is no limit to the specific arrangement.

The above embodiments are merely intended for describing but not for limiting the technical solutions of the present disclosure. Although the present disclosure is described in detail with reference to the above-mentioned embodiments, it should be understood by those skilled in the art that, the technical solutions recited in each of the above-mentioned embodiments may still be modified, or some of or all the technical features may be equivalently replaced, while these modifications or replacements do not make the essence of the corresponding technical solutions depart from the scope of the technical solutions of each of the embodiments of the present disclosure, and should be included in the protection scope of this disclosure.

What is claimed is:

1. A voltage compensation circuit applicable to a display panel comprising multiple rows of scan lines, multiple columns of data lines, and multiple pixel units correspondingly connected with the scan lines and the data lines, wherein the voltage compensation circuit is applicable to the pixel unit of a 2T1C structure and the pixel unit comprises a first transistor, a second transistor, a capacitor, and a light-emitting diode;

positive supply voltage terminals of the respective pixel units are commonly connected, a first terminal of the first transistor is connected to the data line, and a control terminal of the first transistor is connected to the scan line; a second terminal of the first transistor, a first terminal of the capacitor, and a control terminal of the second transistor are commonly connected; a second terminal of the capacitor and a first terminal of the second transistor are commonly connected to form the positive supply voltage terminal of the pixel unit; a second terminal of the second transistor is connected to an anode of the light-emitting diode, and a cathode of the light-emitting diode is connected to a negative supply voltage terminal; and the voltage compensation circuit comprises:

a power supply circuit;

a driver circuit connected with the power supply circuit, the respective data lines, the respective scan lines, and the positive supply voltage terminals of the pixel units, wherein the driver circuit is configured for:

during a voltage sensing period, controlling the pixel units to be powered on, and selectively controlling the first transistors of the respective pixel units to turn on in sequence, and outputting changed data signals to control the second transistors of the respective pixel units to switch from an OFF state to an ON state, wherein the positive supply voltage terminal, the second transistor, the light-emitting diode are conductively connected to the negative supply voltage terminal to generate a current when the second transistor is switched on, and determining whether the second transistor has switched a state by sensing a current generation time, wherein the current generation time is obtained through the positive supply voltage terminals of the respective pixel units;

sensing voltage values of the data signals at the moment the current is generated when the respective pixel units switch the state, and determining threshold voltages of the second transistors of the respective pixel units based on the data signals; and during a voltage compensation period, controlling the pixel units to be powered on and controlling respective rows of pixel units to turn on row by row, and outputting voltage-compensated data signals to the respective pixel units based on the threshold voltages of the second transistors of the respective pixel units.

2. The voltage compensation circuit according to claim 1, wherein the power supply circuit is connected to the positive supply voltage terminals of the pixel units through the driver circuit, or the power supply circuit is directly connected to the positive supply voltage terminals of the pixel units.

3. The voltage compensation circuit according to claim 2, wherein the driver circuit comprises:

a current sensing circuit connected between the power supply circuit and the positive supply voltage terminals of the pixel units, wherein the current sensing circuit is configured for outputting, during the voltage sensing period, a current feedback signal representing that the second transistor of the pixel unit has switched the state when sensing a current of the positive supply voltage signal;

a control output circuit connected with the power supply circuit, the respective data lines, the respective scan lines, and the current sensing circuit, wherein the output circuit is configured for:

during the voltage sensing period, outputting a first control signal to the power supply circuit, so that the power supply circuit outputs the positive supply voltage signal, and the positive supply voltage signal is output to the positive supply voltage terminals of the pixel units through the current sensing circuit;

outputting a row HIGH signal to turn on the first transistor of a corresponding pixel unit, so as to select and control the respective pixel units in sequence for performing voltage sensing;

and during the voltage sensing period of each pixel unit, outputting the changed data signal to control the second transistor of the pixel unit to switch from the OFF state to the ON state;

sensing, when receiving the current feedback signal, the voltage value of the data signal at the moment when the sensed state is switched; and determining the threshold voltage of the second transistor of the pixel unit during each voltage sensing period based on the data signal; and during the voltage compensation period, controlling the power supply circuit to output the positive supply voltage signal to the positive supply voltage terminals of the pixel units, and controlling the respective rows of pixel units to turn on row by row, and outputting the voltage-compensated data signals to the respective pixel units based on the threshold voltages of the second transistors of the respective pixel units.

4. The voltage compensation circuit according to claim 2, wherein the driver circuit comprises:

a current sensing circuit connected between the power supply circuit and the positive supply voltage terminals of the pixel units; wherein the current sensing circuit is configured for outputting, during the voltage sensing period, a current feedback signal representing that the second transistor of the pixel unit has switched the state when sensing a current of the positive supply voltage signal;

a first switch circuit connected with the current sensing circuit in parallel;

a control output circuit connected with the power supply circuit, the respective data lines, the respective scan lines, the current sensing circuit, and the first switch circuit, wherein the control output circuit is configured for:

during the voltage sensing period, outputting a switching-off signal to control the first switch circuit to switch off, so that the positive supply voltage signal is output to the positive supply voltage terminals of the pixel units through the current sensing circuit;

outputting a row HIGH signal to turn on the first transistor of a corresponding pixel unit, so as to select and control the respective pixel units in sequence for performing the voltage sensing; and during the voltage sensing period of each pixel unit, outputting the changed data signal to control the second transistor of the pixel unit to switch from the OFF state to the ON state;

sensing, when receiving the current feedback signal, the voltage value of the data signal at the moment when the sensed state is switched; and determining the threshold voltages of the second transistor of the pixel unit during each voltage sensing period based on the data signal; and during the voltage compensation period, outputting a switching-on signal to control the first switch circuit to switch on, so that the positive supply voltage signal is output to the positive supply voltage terminals of the pixel units through the first switch circuit, and controlling the respective rows of pixel units to turn on row by row, and outputting the voltage-compensated data signals to the respective pixel units based on the threshold voltages of the second transistors of the respective pixel units.

5. The voltage compensation circuit according to claim 4, wherein the driver circuit further comprises a second switch circuit, the second switch circuit and the current sensing circuit are connected in series between the power supply circuit and the positive supply voltage terminals of the pixel units, the second switch circuit is further connected to the control output circuit;

the control output circuit is further configured for:

during the voltage sensing period, outputting a switching-on signal to control the second switch circuit to switch on; and during the voltage compensation period, outputting a switching-off signal to control the second switch circuit to switch off.

6. A voltage compensation method of a voltage compensation circuit applicable to a display panel, wherein the display panel comprises multiple rows of scan lines, multiple columns of data lines, and multiple pixel units correspondingly connected with the scan lines and the data lines, wherein the voltage compensation circuit is applicable to the pixel unit of a 2T1C structure and the pixel unit comprises a first transistor, a second transistor, a capacitor and a light-emitting diode;

positive supply voltage terminals of the respective pixel units are commonly connected, a first terminal of the first transistor is connected to the data line, a control terminal of the first transistor is connected to the scan line; a second terminal of the first transistor, a first terminal of the capacitor and a control terminal of the second transistor are commonly connected; a second terminal of the capacitor and a first terminal of the second transistor are commonly connected to form the positive supply voltage terminal of the pixel unit; a second terminal of the second transistor is connected to an anode of the light-emitting diode, and a cathode of the light-emitting diode is connected to a negative supply voltage terminal;

the voltage compensation circuit comprises:

a power supply circuit;

a driver circuit connected with the power supply circuit, the respective data lines, the respective scan lines, and the positive supply voltage terminals of the pixel units, wherein the driver circuit is configured for:

during a voltage sensing period, controlling the pixel units to be powered on, and selectively controlling the first transistors of the respective pixel units to turn on in sequence, and outputting changed data signals to control the second transistors of the respective pixel units to switch from an OFF state to an ON state, wherein the positive supply voltage terminal, the second transistor, the light-emitting diode are conductively connected to the negative supply voltage terminal to generate a current when the second transistor is switched on, and determining whether the second transistor has switched a state by sensing a current generation time, wherein the current generation time is obtained through the positive supply voltage terminals of the respective pixel units;

sensing voltage values of the data signals at the moment the current is generated when the respective pixel units switch the state, and determining threshold voltages of the second transistors of the respective pixel units based on the data signals; and during a voltage compensation period, controlling the pixel units to be powered on and controlling respective rows of pixel units to turn on row by row, and outputting voltage-compensated data signals to the respective pixel units based on the threshold voltages of the second transistors of the respective pixel units; and the voltage compensation method comprises:

during the voltage sensing period, selecting and controlling the first transistors of the respective pixel units to turn on in sequence, and outputting the changed data signals to control the second transistors of the respective pixel units to switch from the OFF state to the ON state, wherein the positive supply voltage terminal, the second transistor, the light-emitting diode are conductively connected to the negative supply voltage terminal to generate a current when the second transistor is switched on, and determining whether the second transistor has switched a state by sensing a current generation time, wherein the current generation time is obtained through the positive supply voltage terminals of the respective pixel units;

sensing the voltage value of the data signal at the moment the current is generated when each pixel unit switches the state, and determining the threshold voltage of the second transistor of each pixel unit based on the data signal Data; and during the voltage compensation period, controlling the respective rows of pixel units to turn on row by row, and outputting the voltage-compensated data signals to the respective pixel units based on the threshold voltages of the second transistors of the respective pixel units.

7. The voltage compensation method according to claim 6, wherein the power supply circuit is connected to the positive supply voltage terminals of the pixel units through the driver circuit, or the power supply circuit is directly connected to the positive supply voltage terminals of the pixel units.

8. The voltage compensation method according to claim 7, wherein the driver circuit comprises:

a current sensing circuit connected between the power supply circuit and the positive supply voltage terminals of the pixel units, wherein the current sensing circuit is configured for outputting, during the voltage sensing period, a current feedback signal representing that the second transistor of the pixel unit has switched the state when sensing a current of the positive supply voltage signal;

a control output circuit connected with the power supply circuit, the respective data lines, the respective scan lines and the current sensing circuit, wherein the output circuit is configured for:

during the voltage sensing period, outputting a first control signal to the power supply circuit, so that the power supply circuit outputs the positive supply voltage signal, and the positive supply voltage signal is output to the positive supply voltage terminals of the pixel units through the current sensing circuit;

outputting a row HIGH signal to turn on the first transistor of a corresponding pixel unit, so as to select and control the respective pixel units in sequence for performing voltage sensing; and during the voltage sensing period of each pixel unit, outputting the changed data signal to control the second transistor of the pixel unit to switch from the OFF state to the ON state;

sensing, when receiving the current feedback signal, the voltage value of the data signal at the moment when the sensed state is switched; and determining the threshold voltage of the second transistor of the pixel unit during each voltage sensing period based on the data signal; and during the voltage compensation period, controlling the power supply circuit to output the positive supply voltage signal to the positive supply voltage terminals of the pixel units, and controlling the respective rows of pixel units to turn on row by row, and outputting the voltage-compensated data signals to the respective pixel units based on the threshold voltages of the second transistors of the respective pixel units.

9. The voltage compensation method according to claim 7, wherein the driver circuit comprises:

a current sensing circuit connected between the power supply circuit and the positive supply voltage terminals of the pixel units; wherein the current sensing circuit is configured for outputting, during the voltage sensing period, a current feedback signal representing that the second transistor of the pixel unit has switched the state when sensing a current of the positive supply voltage signal;

a first switch circuit connected with the current sensing circuit in parallel;

a control output circuit connected with the power supply circuit, the respective data lines, the respective scan lines, the current sensing circuit and the first switch circuit, wherein the control output circuit is configured for:

during the voltage sensing period, outputting a switching-off signal to control the first switch circuit to switch off, so that the positive supply voltage signal is output to the positive supply voltage terminals of the pixel units through the current sensing circuit;

outputting a row HIGH signal to turn on the first transistor of a corresponding pixel unit, so as to select and control the respective pixel units in sequence for performing the voltage sensing; and during the voltage sensing period of each pixel unit, outputting the changed data signal to control the second transistor of the pixel unit to switch from the OFF state to the ON state;

sensing, when receiving the current feedback signal, the voltage value of the data signal at the moment when the sensed state is switched; and determining the threshold voltages of the second transistor of the pixel unit during each voltage sensing period based on the data signal; and during the voltage compensation period, outputting a switching-on signal to control the first switch circuit to switch on, so that the positive supply voltage signal is output to the positive supply voltage terminals of the pixel units through the first switch circuit, and controlling the respective rows of pixel units to turn on row by row, and outputting the voltage-compensated data signals to the respective pixel units based on the threshold voltages of the second transistors of the respective pixel units.

10. The voltage compensation method according to claim 9, wherein the driver circuit further comprises a second switch circuit, the second switch circuit and the current sensing circuit are connected in series between the power supply circuit and the positive supply voltage terminals of the pixel units, the second switch circuit is further connected to the control output circuit;

the control output circuit is further configured for:

during the voltage sensing period, outputting a switching-on signal to control the second switch circuit to switch on; and during the voltage compensation period, outputting a switching-off signal to control the second switch circuit to switch off.

11. The voltage compensation method according to claim 6, wherein the step of selecting and controlling the first transistors of the respective pixel units to turn on in sequence comprises:

during the voltage sensing period, outputting the row HIGH signals to the first transistors of the respective rows of pixel units row by row, and selecting each row of pixel units 10 to perform the voltage sensing in sequence during the output time period of each row HIGH signal to each row; or during the voltage sensing period, taking a column of pixel units as a pixel groups, and outputting the row HIGH signals row by row in each frame to the respective pixel units in a corresponding pixel group, so as to select and control the respective pixel units of the respective pixel groups to perform the voltage sensing.

12. The voltage compensation method according to claim 11, wherein the power supply circuit is connected to the positive supply voltage terminals of the pixel units through the driver circuit, or the power supply circuit is directly connected to the positive supply voltage terminals of the pixel units.

13. The voltage compensation method according to claim 6, wherein the step of outputting the changed data signals to control the second transistors of the respective pixel units to switch from the OFF state to the ON state comprises:

during the voltage sensing period of a corresponding pixel unit, outputting the changed data signal to the second transistor of a matching pixel unit to control the second transistor of the pixel unit to switch from the OFF state to the ON state; and outputting a preset LOW voltage to the second transistors of the respective unmatched pixel units in the same row, to control the unmatched pixel units in the same row to turn off.

14. The voltage compensation method according to claim 13, wherein the power supply circuit is connected to the positive supply voltage terminals of the pixel units through the driver circuit, or the power supply circuit is directly connected to the positive supply voltage terminals of the pixel units.

15. The voltage compensation method according to claim 6, wherein the voltage compensation method further comprises:

during the voltage sensing period and the voltage compensation period, outputting the positive supply voltage signal to the positive supply voltage terminals of the pixel units.

16. A display device comprising a display panel and a voltage compensation circuit, wherein the voltage compensation circuit is correspondingly connected to the display panel, and the voltage compensation circuit is arranged on the display panel or separated from the display panel;

wherein the display panel comprises multiple rows of scan lines, multiple columns of data lines and multiple pixel units correspondingly connected with the scan lines and the data lines, wherein the voltage compensation circuit is applicable to the pixel unit of a 2T1C structure and the pixel unit comprises a first transistor, a second transistor, a capacitor and a light-emitting diode;

positive supply voltage terminals of the respective pixel units are commonly connected, a first terminal of the first transistor is connected to the data line, a control terminal of the first transistor is connected to the scan line; a second terminal of the first transistor, a first terminal of the capacitor, and a control terminal of the second transistor are commonly connected; a second terminal of the capacitor and a first terminal of the second transistor are commonly connected to form the positive supply voltage terminal of the pixel unit; a second terminal of the second transistor is connected to an anode of the light-emitting diode, and a cathode of the light-emitting diode is connected to a negative supply voltage terminal;

the voltage compensation circuit comprises:

a power supply circuit;

a driver circuit connected with the power supply circuit, the respective data lines, the respective scan lines, and the positive supply voltage terminals of the pixel units, wherein the driver circuit is configured for:

during a voltage sensing period, controlling the pixel units to be powered on, and selectively controlling the first transistors of the respective pixel units to turn on in sequence, and outputting changed data signals to control the second transistors of the respective pixel units to switch from an OFF state to an ON state, wherein the positive supply voltage terminal, the second transistor, the light-emitting diode are conductively connected to the negative supply voltage terminal to generate a current when the second transistor is switched on, and determining whether the second transistor has switched a state by sensing a current generation time, wherein the current generation time is obtained through the positive supply voltage terminals of the respective pixel units;

sensing voltage values of the data signals at the moment the current is generated when the respective pixel units switch the state, and determining threshold voltages of the second transistors of the respective pixel units based on the data signals; and during a voltage compensation period, controlling the pixel units to be powered on and controlling respective rows of pixel units to turn on row by row, and outputting voltage-compensated data signals to the respective pixel units based on the threshold voltages of the second transistors of the respective pixel units.

17. The display device according to claim 16, wherein the power supply circuit is connected to the positive supply voltage terminals of the pixel units through the driver circuit, or the power supply circuit is directly connected to the positive supply voltage terminals of the pixel units.

18. The display device according to claim 17, wherein the driver circuit comprises:

a current sensing circuit connected between the power supply circuit and the positive supply voltage terminals of the pixel units, wherein the current sensing circuit is configured for outputting, during the voltage sensing period, a current feedback signal representing that the second transistor of the pixel unit has switched the state when sensing a current of the positive supply voltage signal;

a control output circuit connected with the power supply circuit, the respective data lines, the respective scan lines, and the current sensing circuit, wherein the output circuit is configured for:

during the voltage sensing period, outputting a first control signal to the power supply circuit, so that the power supply circuit outputs the positive supply voltage signal, and the positive supply voltage signal is output to the positive supply voltage terminals of the pixel units through the current sensing circuit;

outputting a row HIGH signal to turn on the first transistor of a corresponding pixel unit, so as to select and control the respective pixel units in sequence for performing voltage sensing; and during the voltage sensing period of each pixel unit, outputting the changed data signal to control the second transistor of the pixel unit to switch from the OFF state to the ON state;

sensing, when receiving the current feedback signal, the voltage value of the data signal at the moment when the sensed state is switched; and determining the threshold voltage of the second transistor of the pixel unit during each voltage sensing period based on the data signal; and during the voltage compensation period, controlling the power supply circuit to output the positive supply voltage signal to the positive supply voltage terminals of the pixel units, and controlling the respective rows of pixel units to turn on row by row, and outputting the voltage-compensated data signals to the respective pixel units based on the threshold voltages of the second transistors of the respective pixel units.

19. The display device according to claim 17, wherein the driver circuit comprises:

a current sensing circuit connected between the power supply circuit and the positive supply voltage terminals of the pixel units; wherein the current sensing circuit is configured for outputting, during the voltage sensing period, a current feedback signal representing that the second transistor of the pixel unit has switched the state when sensing a current of the positive supply voltage signal;

a first switch circuit connected with the current sensing circuit in parallel;

a control output circuit connected with the power supply circuit, the respective data lines, the respective scan lines, the current sensing circuit and the first switch circuit, wherein the control output circuit is configured for:

during the voltage sensing period, outputting a switching-off signal to control the first switch circuit to switch off, so that the positive supply voltage signal is output to the positive supply voltage terminals of the pixel units through the current sensing circuit;

outputting a row HIGH signal to turn on the first transistor of a corresponding pixel unit, so as to select and control the respective pixel units in sequence for performing the voltage sensing; and during the voltage sensing period of each pixel unit, outputting the changed data signal to control the second transistor of the pixel unit to switch from the OFF state to the ON state;

sensing, when receiving the current feedback signal, the voltage value of the data signal at the moment when the sensed state is switched; and determining the threshold voltages of the second transistor of the pixel unit during each voltage sensing period based on the data signal; and during the voltage compensation period, outputting a switching-on signal to control the first switch circuit to switch on, so that the positive supply voltage signal is output to the positive supply voltage terminals of the pixel units through the first switch circuit, and controlling the respective rows of pixel units to turn on row by row, and outputting the voltage-compensated data signals to the respective pixel units based on the threshold voltages of the second transistors of the respective pixel units.

20. The display device according to claim 19, wherein the driver circuit further comprises a second switch circuit, the second switch circuit and the current sensing circuit are connected in series between the power supply circuit and the positive supply voltage terminals of the pixel units, the second switch circuit is further connected to the control output circuit;

the control output circuit is further configured for:

during the voltage sensing period, outputting a switching-on signal to control the second switch circuit to switch on; and during the voltage compensation period, outputting a switching-off signal to control the second switch circuit to switch off.

* * * * *